US009188761B2

(12) United States Patent
Yoshida et al.

(10) Patent No.: US 9,188,761 B2
(45) Date of Patent: Nov. 17, 2015

(54) OPTICAL DEVICE AND METHOD OF MANUFACTURING THE SAME

(75) Inventors: Ryuichi Yoshida, Kawasaki (JP); Kohei Shibata, Kawasaki (JP); Toshiya Kishida, Kawasaki (JP); Hiroyuki Furukawa, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 763 days.

(21) Appl. No.: 13/013,260

(22) Filed: Jan. 25, 2011

(65) Prior Publication Data
US 2011/0204215 A1 Aug. 25, 2011

(30) Foreign Application Priority Data

Feb. 25, 2010 (JP) .................................. 2010-039777

(51) Int. Cl.
| H01J 40/14 | (2006.01) |
| G02B 7/02 | (2006.01) |
| G02B 6/42 | (2006.01) |
| G02B 27/00 | (2006.01) |

(52) U.S. Cl.
CPC .............. *G02B 7/021* (2013.01); *G02B 6/4226* (2013.01); *G02B 6/4228* (2013.01); *G02B 6/4244* (2013.01); *G02B 6/4251* (2013.01); *G02B 27/00* (2013.01); *Y10T 29/49826* (2015.01)

(58) Field of Classification Search
CPC .... G02B 6/4226; G02B 6/4228; G02B 27/00; G02B 7/021

USPC .................................. 250/239; 385/73, 74, 94
See application file for complete search history.

(56) References Cited

U.S. PATENT DOCUMENTS

| 2002/0033938 | A1* | 3/2002 | Jenner ............................. 356/32 |
| 2003/0231848 | A1* | 12/2003 | Yuan et al. ..................... 385/135 |
| 2004/0042754 | A1* | 3/2004 | Arima et al. ................... 385/135 |
| 2004/0151432 | A1* | 8/2004 | Tabuchi et al. ................... 385/37 |
| 2007/0177151 | A1 | 8/2007 | Isomura et al. |
| 2008/0193083 | A1 | 8/2008 | Nagai et al. |
| 2008/0232747 | A1* | 9/2008 | Ono et al. ....................... 385/91 |
| 2009/0263080 | A1* | 10/2009 | Duricic et al. .................. 385/16 |
| 2010/0092147 | A1* | 4/2010 | Desard et al. ................. 385/135 |
| 2010/0282951 | A1* | 11/2010 | Costello et al. ............... 250/221 |

FOREIGN PATENT DOCUMENTS

| JP | 7-84158 | 3/1995 |
| JP | 2003-57498 | 2/2003 |
| JP | 2007-201939 | 8/2007 |
| JP | 2008-197347 | 8/2008 |

OTHER PUBLICATIONS

Japanese Office Action issued May 21, 2013 in corresponding Japanese Patent Application No. 2010-039777.

* cited by examiner

*Primary Examiner* — Georgia Y Epps
*Assistant Examiner* — Kevin Wyatt
(74) *Attorney, Agent, or Firm* — Staas & Halsey LLP

(57) ABSTRACT

An optical device includes: an optical component; a case air-sealed, and made of metal, the optical component being secured within the case; and a lens provided within the case, and positionally adjusted in consideration of a deformation of the case air-sealed, light emitted from the optical component passing through the lens or light traveling to the optical component passing through the lens.

6 Claims, 7 Drawing Sheets

OPTICAL DEVICE AND METHOD OF MANUFACTURING THE SAME

CROSS-REFERENCE TO RELATED APPLICATIONS

This application is based upon and claims the benefit of priority of the prior Japanese Patent Application No. 2010-39777, filed on Feb. 25, 2010, the entire contents of which are incorporated herein by reference.

FIELD

The embodiment discussed herein is related to an optical device and a method of manufacturing the same.

BACKGROUND

There is an optical device including: a lens; and an optical component transmitting light to the lens or receiving light that has passed through the lens. The technology related to such an optical device is disclosed in Japanese Unexamined Patent Application Publication No. 2007-201939.

To modularize such a lens and an optical component, it is conceivable to provide the lens and the optical component within a single case and to air-seal the case. However, when the case is air-sealed, the case might be deformed before and after air-sealing. This deformation might cause the lens to be displaced from its desirable position.

SUMMARY

According to an aspect of the embodiment, an optical device includes: an optical component; a case air-sealed, and made of metal, the optical component being secured within the case; and a lens provided within the case, and positionally adjusted in consideration of a deformation of the case air-sealed, light emitted from the optical component passing through the lens or light traveling to the optical component passing through the lens.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
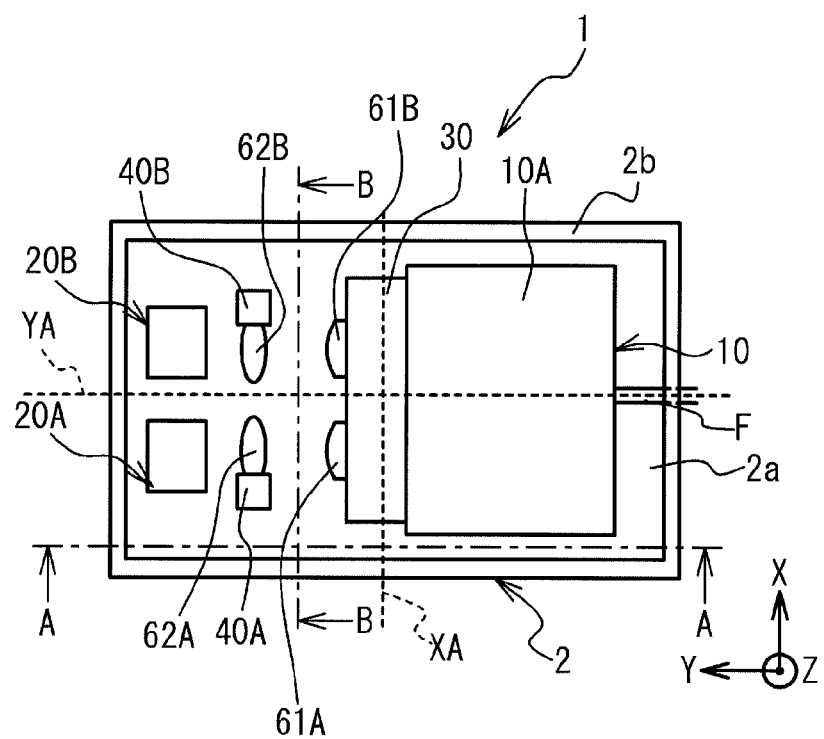
FIG. 1 is a top view of an optical device.

FIG. 1 is a top plan view of an optical device 1. The optical device 1 includes: a case 2; an interferometer module 10; light receiving modules 20A and 20B, and lenses 62A and 62B. The upper portion of the case 2 is opened. The case 2 includes: a bottom wall 2a; side walls 2b surrounding the bottom wall 2a. The bottom wall 2a has a substantially rectangular shape. The interferometer module 10 and the light receiving modules 20A and 20B are secured on the inner side of the bottom wall 2a. The interferometer module 10 and the light receiving modules 20A and 20B are housed within the case 2 to be modularized. The lenses 62A and 62B are supported by support members 40A and 40B, respectively. The support members 40A and 40B are secured on the bottom wall 2a of the case 2. The interferometer module 10 includes a PLC tip 10A, a glass block 30, and lenses 61A and 61B. The interferometer module 10 is connected to an optical fiber F. The optical fiber F penetrates through an opening formed in the side wall 2b of the case 2. This opening is sealed by solder or the like.

The lens 61A, 61B, 62A, and 62B are not arranged on the center axis YA extending in the Y-direction through the center of the bottom wall 2a. Also, these lenses are not arranged on the center axis XA extending in the X-direction through the center of the bottom wall 2a.

Figure 2:
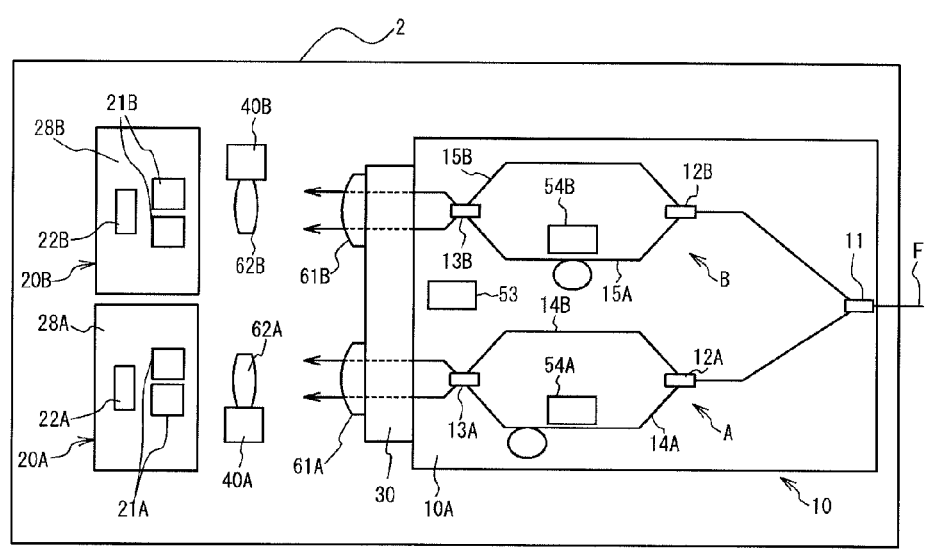
FIG. 2 is an explanatory view of a structure of the optical device.

FIG. 2 is an explanatory view of a structure of the optical device 1. The interferometer module 10 includes: an input port; an optical splitter 11; and interferometers A and B. The optical splitter 11 causes DQPSK modulation signals input by an input port to be diverged into two waveguides. The interferometers A and B are input respectively with the DQPSK modulation signals diverged by the optical splitter 11. The input port is connected with the optical fiber F (a single mode) transmitting the DQPSK modulation signals.

The interferometer A includes: an optical splitter 12A; an optical coupler 13A; and waveguides 14A and 14B. The optical splitter 12A evenly distributes the DQPSK modulating signals. The waveguides 14A and 14B are provided between the optical splitter 12A and the optical coupler 13A. The waveguide 14A is longer than the waveguide 14B. The waveguide 14A provides relative delay τ by one symbol to the DQPSK modulation signal. In the optical coupler 13A, it is set such that optical signals respectively flowing through the waveguides 14A and 14B have a phase difference of $\pi/4$ [rad] of the optical signal wavelength.

The interferometer B has a structure similar to that of the interferometer A. In the interferometer B, the optical signals respectively flowing through the waveguides 15A and 15B have a phase difference of $-\pi/4$ [rad]. The optical signals are coupled (interfered) with each other in optical couplers of the interferometers A and B. The optical signals are output from two output ports each provided in the interferometers A and B. The interferometer module 10 is achieved as a PLC tip (a PLC type delay interferometer) 10A using the PLC technology.

The PLC tip 10A may be secured directly on the bottom wall 2a of the case 2, or may be secured on the bottom wall 2a through a temperature-adjusting element such as a Peltier element.

On the PLC tip 10A, there are provided: a temperature sensor 53 detecting the temperature of the PLC tip 10A; and heaters 54A and 54B heating the waveguides 14A and 15A respectively. For example, the temperature sensor 53 is a thermistor or a Resistance Temperature Detector (RTD). For example, the heaters 54A and 54B are thin-film heaters, or micro heaters.

The light emitted from the optical coupler 13A of the interferometer A passes through the glass block 30 to travel and pass through the lens 61A. Likewise, the light emitted from an optical coupler 13B of the interferometer B passes through the glass block 30 and the lens 61B. The glass block 30 is secured at the end of the PLC tip 10A. The lenses 61A and 61B are secured at the end of the glass block 30. The lenses 61A and 61B are indirectly secured on the bottom wall 2a of the case 2 through the glass block 30 and the PLC tip 10A.

The light emitted by the lenses 61A and 61B travel to the lenses 62A and 62B, respectively. The lenses 62A and 62B are secured in the support members 40A and 40B, respectively. That is, the lenses 62A and 62B are indirectly secured on the bottom wall 2a of the case 2 through the support members 40A and 40B, respectively. The lights that have passed through the lenses 62A and 62B are coupled in the light receiving modules 20A and 20B, respectively.

The light receiving module 20A include: two Photo Detectors (PDs) 21A; an amplifier (Trance Impedance Amp (TIA)) 22A amplifying the difference between the outputs of two PDs 21A; and a support member 28A supporting the PDs 21A and the amplifier 22A. Likewise, the light receiving module 20B includes: two PDs 21B, an amplifier 22B, and a support member 28B. Rays of light that have passed through the lens 62A are coupled in two PDs 21A, and the rays of light have passed through the lens 62B are coupled in two PDs 21B. Further, unless the diameter of a light-receiving surface of a light receiving element (for example, a photodiode) is made smaller, as the baud rate for transmission increases, there is a tendency that the optical signals are not suitably converted into the electrical signals.

The PLC tip 10A corresponds to an optical component. The light emitted from the optical component passes through the lenses 61A, 61B, 62A, and 62B. In other words, the PLC tip 10A corresponds to an optical component emitting light toward a lens. The PDs 21A and 21B correspond to optical components. The light which will travel the optical components passes through the lenses 61A, 61B, 62A, and 62B. In other words, the PDs 21A and 21B correspond to optical components receiving the light that has passed through the lens.

Next, the deformation of the case 2 before and after sealing will be described.

FIGS. 3A, 3B, 4A, and 4B are explanatory views of the deformation of the case 2 before and after sealing.

Figure 3A:
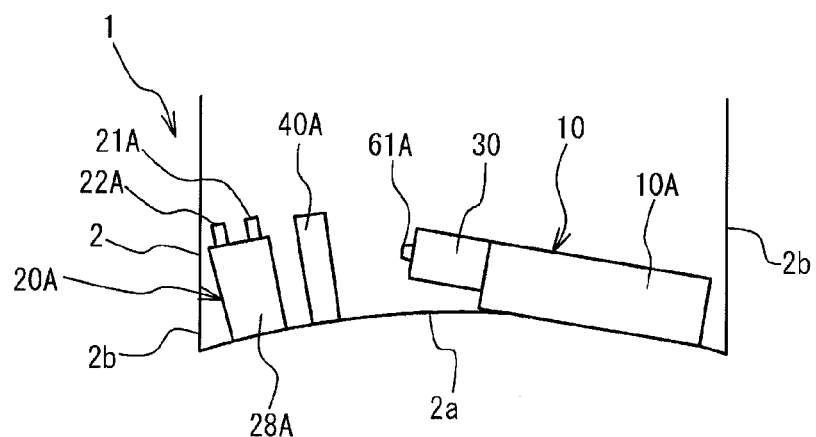
FIGS. 3A and 3B are explanatory views of deformation of the case before and after sealing.
Figure 3B:
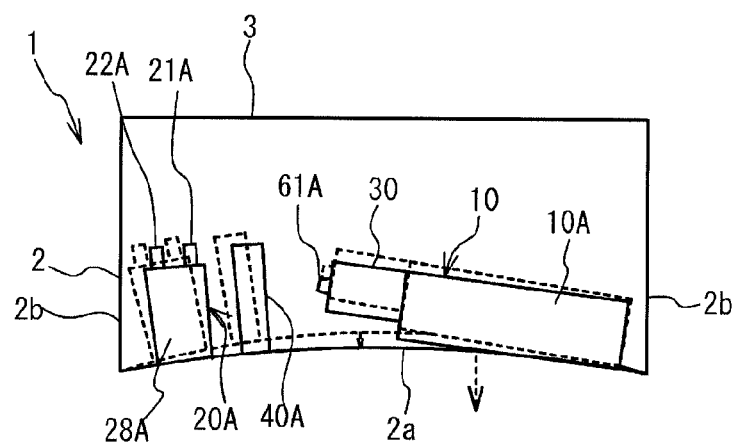
Figure 4A:
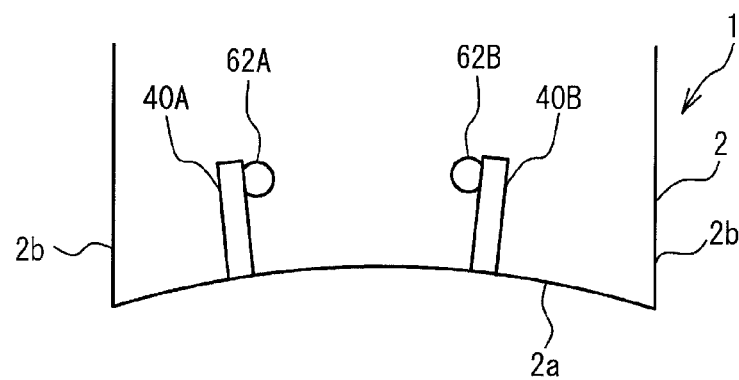
FIGS. 4A and 4B are explanatory views of the deformation of the case before and after sealing.
Figure 4B:
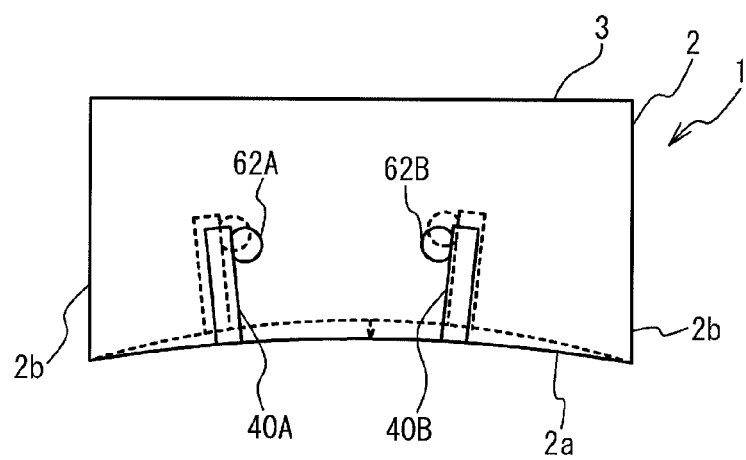

FIG. 3A is a cross-sectional view of the optical device 1 taken along line A-A before sealing. FIG. 3B is a cross-sectional view of the optical device 1 taken along line A-A after sealing. FIG. 4A is a cross-sectional view of the optical device 1 taken along B-B line before sealing. FIG. 4B is a cross-sectional view of the optical device 1 taken along line B-B after sealing. As illustrated in FIGS. 3A and 4A, the bottom wall 2a of the case 2 curves to protrude upwardly. However, this is exaggeratingly illustrated to facilitate the understanding of the embodiment.

FIGS. 3A and 4B are cross-sectional views of the optical device 1 taken along line A-A after the case 2 and a lid 3 and welded to air-seal the case 2. The case 2 and the lid 3 are jointed by seam welding. The case 2 and the lid 3 are made of metal such as Invar alloy or Kovar alloy. The case 2 is deformed after sealing. Conceivably, one of reasons why the case 2 is deformed is the load applied to the case 2 at the time of welding. The bottom wall 2a is deformed with ease because of its large area and a flat shape. As illustrated in FIGS. 3B and 4B, the bottom wall 2a moves downwardly after sealing, as compared to before sealing. Accordingly, the lenses 61A, 61B, 62A, and 62B are displaced before and after sealing. Any lens especially is not arranged on the center axes YA and XA, as indicated in FIG. 1. For this reason, the lenses 61A, 61B, 62A, and 62B are easily displaced even when the bottom wall 2a is slightly deformed.

When the baud rate of the transmission is 20 GHz or more, the diameter of the acceptance surface of the light receiving element is further reduced. Thus, there occurs a phenomenon that the displacement of the lens causes the reduction of the light amount of the optical signals that can be received. Thus, in the communication using optical signals at 20 GHz of the baud rate, when one optical component includes a light receiving element capable of converting the optical signals into the electrical signals with 20 GHz of the baud rate or more, it is important to positionally adjust the acceptance surface with accuracy.

Additionally, in a case where the bottom wall 2a is horizontal before sealing, the bottom wall 2a curves to protrude downwardly after sealing. Further, in a case where the bottom wall 2a curves to protrude downwardly before sealing, the bottom wall 2a further protrudes downwardly after sealing.

Figure 5:
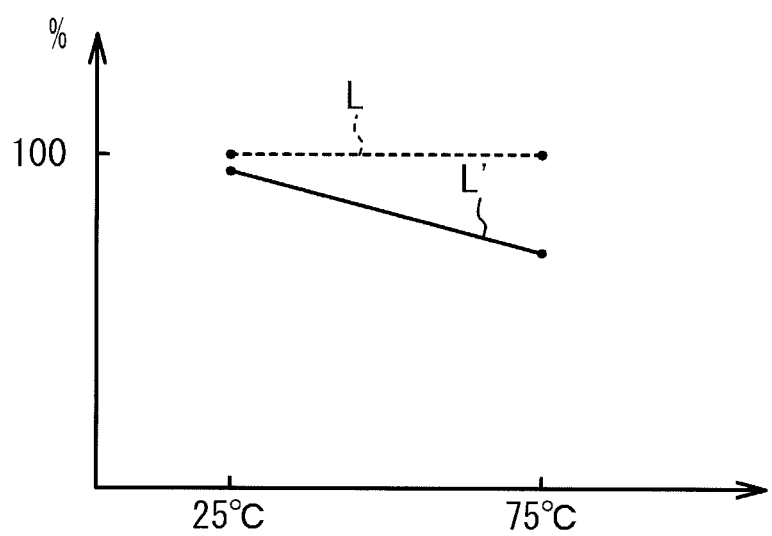
FIG. 5 is a graph representing a change in light responsivity of a PD before and after sealing.

FIG. 5 is a graph illustrating the change in the light responsivity (A/W) of the PD 21A before and after sealing. The graph of FIG. 5 represents the responsivity of a single PD 21A. There are represented the cases where an ambient temperature of the optical device 1 is 25 degrees and 75 degrees Celsius. In addition, the lenses 61A, 61B, 62A, and 62B are set respectively at the desirable positions in consideration of the light responses of the PDs 21A, as a reference of the bottom wall 2a before the case 2 is sealed.

A line L represents the responsivity of the PD 21A before sealing. Before sealing, the responsivity of the PD 21A at any temperature is not greatly changed. A line L' represents the responsivity of the PD 21A after sealing. The responsivity of the PD 21A after sealing is drastically decreased from that before sealing. Specially, the difference in the responsivity of the PD 21A before and after sealing is larger, as the ambient temperature of the optical device 1 is high.

In this way, the lenses 61A, 61B, 62A, and 62B are displaced from the desirable positions by the deformation of the case 2 before and after sealing, so that the responsivity of the PD 21A is deteriorated. However, the displacement degree of the lens before and after sealing is calculated, and the lens is adjusted in consideration of the displacement degree, thereby setting the lens at the desirable position.

Figure 6A:
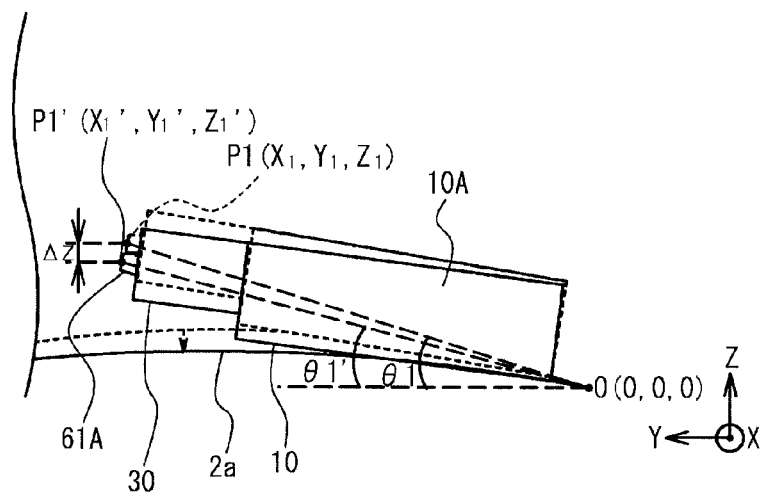
FIGS. 6A and 6B are explanatory views of an example of a calculation method of a displacement degree of the lens.
Figure 6B:
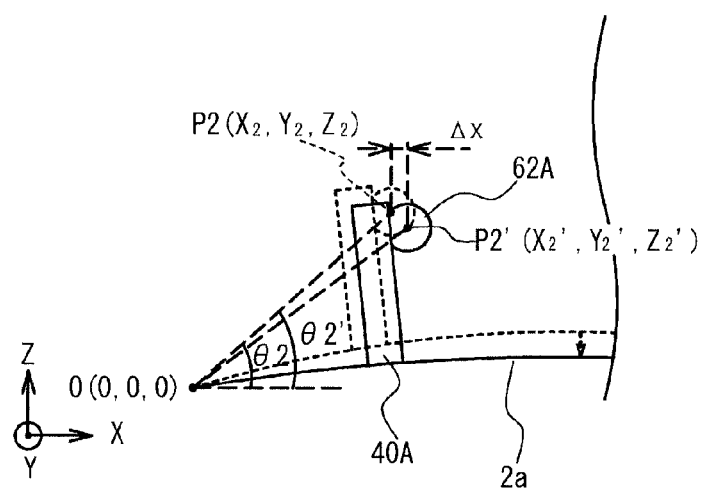

First, an example of a calculation method of the displacement degree of the lens will be described. FIGS. 6A and 6B are explanatory views of the calculation method of the displacement degree of the lens. FIG. 6A is an explanatory view of the calculation of the displacement degree of the lens 61A in the Z-axis direction. A coordinate point of the corner of the case 2 is assumed O, namely (x, y, z)=(0, 0, 0). $P1(x1, y1, z1)$ represents a coordinate point of the lens 61A before sealing, and $P1'(x1', y1', z1')$ represents a coordinate point of the lens 61A after sealing. $\theta 1$ represents an angle between a straight line connecting the point O and point P1, and the horizontal line. $\theta 1'$ represents an angle between a straight line connecting the point O and point P1', and the horizontal line. $r1$ represents a distance between the point O and point P1. $r1'$ represents a distance between the point O and point P1'.

The displacement degree $\Delta Z$ of the lens 61A in the Z-axis direction before and after sealing can be estimated by the following formula.

$$\Delta Z = z1 - z1' = r1 \sin \theta 1 - r1' \sin \theta 1'$$

It is assumed that the lens 61A moves in a circular arc about the point O, $r1=r1'$ is established.

Thus, $\Delta Z = r1 (\sin \theta 1 - \sin \theta 1') = (y1^2 + z1^2)^{1/2} \times (\sin \theta 1 - \sin \theta 1')$ is established.

Since y1 and z1 are values of the lens 61A before sealing, these values can be calculated based on the design condition of the lens 61A, the position of the interferometer module 10 relative to the bottom wall 2a, and the like. Since the angle θ1 represents the angle between the straight line connecting the point O and point P1 and the horizontal line before sealing, the angle θ1 can be calculated by measuring the bottom wall 2a of the case 2 before sealing. For example, the bottom wall 2a is measured with a step meter or the like, thereby calculating the angle θ1 before sealing.

The bottom wall 2a of the case actually sealed is beforehand measured, thereby estimating the angle θ1' on the basis of the measurement value. In this case, the bottom wall 2a after sealing is measured with, for example, a step meter. This can estimate the displacement degree of the lens 61A in the Z-direction caused by sealing the case 2. The displacement degree of the lens 61B is estimated by a method similar to that mentioned above.

FIG. 6B is an explanatory view of the calculation of the displacement degree of the lens 62A in the X-axis direction.

P2 (x2, y2, z2) represents a coordinate point of the lens 62A after sealing. P2'(x2', y2', z2') represents a coordinate point of the lens 62A before sealing. θ2 represents an angle between a straight line connecting the point O and point P2, and the horizontal line. θ2' represents an angle between a straight line connecting the point O and point P2', and the horizontal line. r2 represents a distance between the points O and P2. r2' represents a distance between the points O and P2'.

$$\Delta X = x2 - x2' = r2 \cos \theta 2 - r2' \cos \theta 2'$$

When r2=r2' is assumed,
$\Delta X = r2 (\cos \theta 2 - \cos \theta 2') = (x2^2 + z2^2)^{1/2} \times (\cos \theta 2 - \cos \theta 2')$ are established.

Since x2 and z2 are values of the lens 62A before sealing, these values can be calculated based on the design condition of the support member 40A, the position thereof relative to the bottom wall 2a, and the like. The angle θ2 can be calculated by measuring the bottom wall 2a of the case 2 before sealing. The bottom wall 2a of the case actually sealed is beforehand measured, thereby estimating the angle θ2' on the basis of the measurement value. This can estimate the displacement degree of the lens 62A in the X-direction caused by sealing the case 2. In a method similar to that mentioned above, the displacement degree of the lens 62B is estimated.

Additionally, the displacement degree in the Y-direction may be estimated in a method as described above. The above calculation methods of the displacement degree are examples. By a method other than the above, the displacement degree may be calculated.

Next, the lens is positionally adjusted based on the displacement degree.

After the interferometer module 10 in which the glass block 30 is secured is secured on the bottom wall 2a, the lens 61A is positionally adjusted relative to the glass block 30 to be secured thereto. Specifically, the lens 61A is secured to the glass block 30 in consideration of the displacement degree ΔZ in the Z-axis direction calculated by the above method. After that, the case 2 is sealed, the lens 61A is located at a desirable position in the Z-axis direction after the case 2 is sealed. The lens 61B is positionally adjusted in a method as described above.

Similarly, the support member 40A is adjusted relative to the bottom wall 2a to secure the support member 40A on the bottom wall 2a. Specifically, the support member 40A is secured on the bottom wall 2a in consideration of the displacement degree ΔX in the x-axis direction calculated by the above method. Therefore, the lens 62A is located at the desirable position in the X-axis direction after the case 2 is sealed. The lens 62B is positionally adjusted in a method as described above. Additionally, in the case where the lens 62A is positionally adjusted, the support member 40A secured with the lens 62A may be positionally adjusted relative to the bottom wall 2a, or the support member 40A and the lens 62A may be positionally adjusted together.

Figure 7:
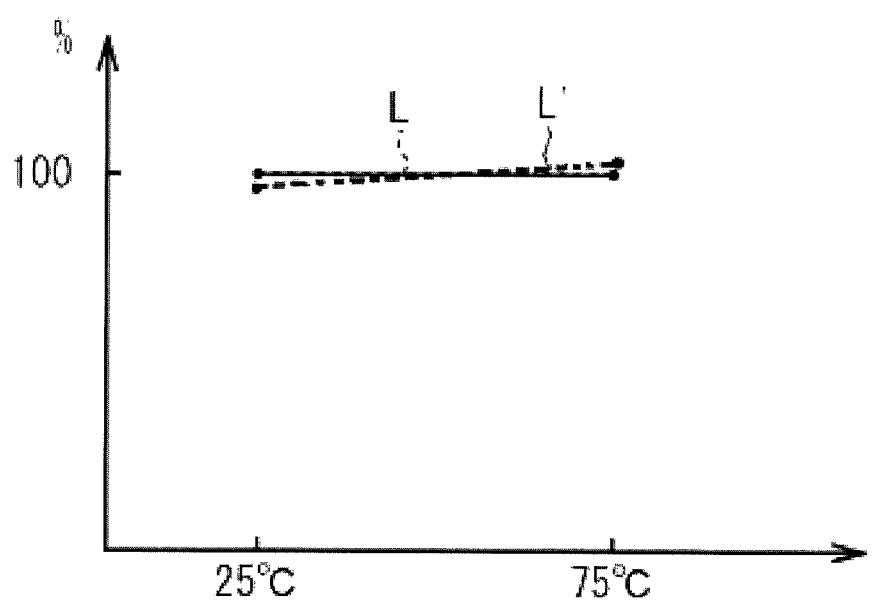
FIG. 7 is a graph representing a change in the light responsivity of the PD before and after sealing in a case where the lens is positionally adjusted.

FIG. 7 is a graph illustrating the change in the light responsivity (A/W) of the PD 21A before and after sealing in the case where the lens is positionally adjusted. A line L represents the responsivity of the PD 21A before sealing. A line L' represents the responsivity of the PD 21A after sealing. Before sealing, the responsivity of the PD 21A at a high temperature is slightly higher than that at an ambient temperature. This is because of the lens 61A and the like are positionally adjusted in consideration of the deformation of the case 2 after sealing, and the lens 61A and the like are displaced from the desirable positions before sealing. However, the lens 61A and the like are set to be located at their desirable positions after sealing. Therefore, the responsivity after sealing is high regardless of the temperature.

In this way, the lenses are positionally adjusted in consideration of the deformation of the case 2 air-sealed, thereby locating the lenses 61A, 61B, 62A, and 62B at their desirable positions after sealing. This prevents the degradation of the coupling efficiency between the lenses 61A, 61B, 62A, and 62B and the light receiving modules 20A and 20B. In other words, this prevents the degradation of the coupling efficiency between the lenses 62A and 62B and the interferometer module 10.

As mentioned above, the lens 61A is positionally adjusted only in the Z-axis direction, and the lens 62A is positionally adjusted only in the X-axis direction. When single lens is positionally adjusted in plural axial directions, it is difficult to ensure the positional accuracy of the lens. However, as mentioned above, the different lenses are positionally adjusted in the different directions, respectively, whereby it is easy to ensure the positional accuracy of each lens. However, the lenses 61A and 61B may be positionally adjusted in the X-axis or Y-axis direction. The lenses 62A and 62B may be positionally adjusted in the Y-axis or Z-axis direction.

In above embodiment, the optical device may not be provided with the amplifier. It may be configured such that light is irradiated from an optical fiber and enters the light receiving module 20A or 20B through a lens. The optical component may be a light-receiving element such as a phototransistor instead of a photodiode.

The above embodiment has described the optical device receiving light. However, the optical device may be any device that transmits light. The optical component emitting light toward the lens may be a light emitting element such as a laser diode, an LED, or the like. A modulator or an LN (LiNbO3: lithium niobate) modulator may be employed as the optical component through which the light passes through the lens.

All examples and conditional language recited herein are intended for pedagogical purposes to aid the reader in understanding the invention and the concepts contributed by the inventor to furthering the art, and are to be constructed as being without limitation to such specifically recited examples and conditions, nor does the organization of such examples in the specification relate to a showing of the superiority and inferiority of the invention. Although the embodiment of the present inventions has been described in detail, it should be understood that the various changes, substitutions, and alterations could be made hereto without departing from the sprit and scope of the invention.

What is claimed is:
1. An optical device comprising:
   an optical component;

a case air-sealed, and made of metal, the optical component being secured within the case;

a lens provided within the case, and positionally adjusted in consideration of a deformation of the case with air-sealed, light emitted from the optical component passing through the lens or light traveling to the optical component passing through the lens; and a support member supporting the lens, being distant from the optical component, and directly secured on an inner bottom surface of the case, wherein the optical component is directly secured on the inner bottom surface or is supported by another support member directly secured on the inner bottom surface, wherein a position of the lens relative to the optical component is displaced from a predetermined position before the case is air-sealed, wherein the position of the lens relative to the optical component is positioned at the predetermined position, and the inner bottom surface is deformed after the case is air-sealed.

2. The optical device of claim 1, wherein the lens includes first and second lenses through which the light emitted from the optical component passes or through which the light travels to the optical component passes, and the first and second lenses are positionally adjusted in different directions.

3. The optical device of claim 1, wherein the lens is spaced from a central axis passing through a center of the inner bottom surface of the case in which the lens is indirectly secured.

4. The optical device of claim 1, wherein the light passing through the lens is an optical signal with a baud rate of 20 GHz or more.

5. The optical device of claim 1, wherein the optical component comprises a light receiving element performs photoelectric conversion of an optical signal with a baud rate of 20 GHz or more.

6. A method of manufacturing an optical device, comprising:

estimating a deformation degree of a case before and after the case is air-sealed;

directly securing an optical component on an inner bottom surface of the case or directly securing a support member supporting the optical component on the inner bottom surface, before the case is air-sealed;

positionally adjusting a lens in consideration of the deformation degree of the case air-sealed, light emitted from the optical component passing through the lens or light traveling to the optical component passing through the lens;

directly securing another support member supporting the lens on the inner bottom surface before the case is air-sealed; and air-sealing the case, wherein a position of the lens relative to the optical component is displaced from a predetermined position before the case is air-sealed, wherein the position of the lens relative to the optical component is positioned at the predetermined position, and the inner bottom surface is deformed after the case is air-sealed.

* * * * *